United States Patent
Tang et al.

(10) Patent No.: US 8,355,099 B2
(45) Date of Patent: Jan. 15, 2013

(54) PLASMONIC DEVICE TUNED USING LIQUID CRYSTAL MOLECULE DIPOLE CONTROL

(75) Inventors: Liang Tang, Vancouver, WA (US); Akinori Hashimura, Vancouver, WA (US); Jiandong Huang, Vancouver, WA (US); Apostolos T. Voutsas, Portland, OR (US)

(73) Assignee: Sharp Labortories of America, Inc., Camas, WA (US)

( * ) Notice: Subject to any disclaimer, the term of this patent is extended or adjusted under 35 U.S.C. 154(b) by 614 days.

(21) Appl. No.: 12/635,349

(22) Filed: Dec. 10, 2009

(65) Prior Publication Data

US 2011/0109821 A1    May 12, 2011

Related U.S. Application Data

(63) Continuation-in-part of application No. 12/621,567, filed on Nov. 19, 2009, which is a continuation-in-part of application No. 12/614,368, filed on Nov. 6, 2009, now Pat. No. 8,045,107.

(51) Int. Cl.
*G02F 1/1333*    (2006.01)
(52) U.S. Cl. ........... 349/88; 349/106; 349/166; 359/296

(58) Field of Classification Search .................. None
See application file for complete search history.

(56) References Cited

U.S. PATENT DOCUMENTS

| | | | | |
|---|---|---|---|---|
| 6,664,944 | B1 * | 12/2003 | Albert et al. | 345/107 |
| 2006/0284829 | A1 * | 12/2006 | Moriyama et al. | 345/107 |
| 2009/0034055 | A1 * | 2/2009 | Gibson | 359/296 |

* cited by examiner

*Primary Examiner* — Richard Kim
(74) *Attorney, Agent, or Firm* — Law Office of Gerald Maliszewski; Gerald Maliszewski

(57) ABSTRACT

A plasmonic display device is provided with liquid crystal dipole molecule control. The device is made from a first set of electrodes including at least one electrically conductive top electrode and at least one electrically conductive bottom electrode capable of generating a first electric field in a first direction. A second set of electrodes, including an electrically conductive right electrode and an electrically conductive left electrode, is capable of generating a second electric field in a second first direction. A dielectric layer overlies the bottom electrode, made from a liquid crystal material with molecules having dipoles responsive to an electric field. A plasmonic layer, including a plurality of discrete plasmonic particles, is interposed between the first and second set of electrodes and in contact with the dielectric layer. In one aspect, the plasmonic layer is embedded in the dielectric layer.

15 Claims, 8 Drawing Sheets

(PENDING ART)

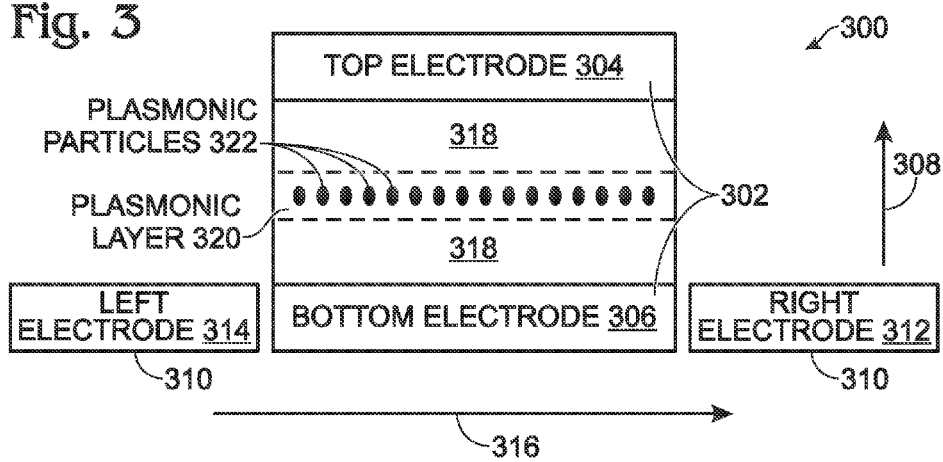
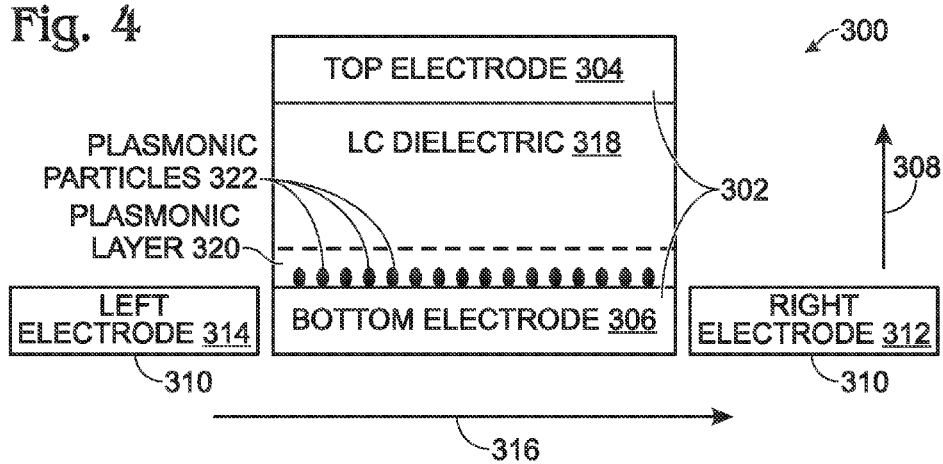
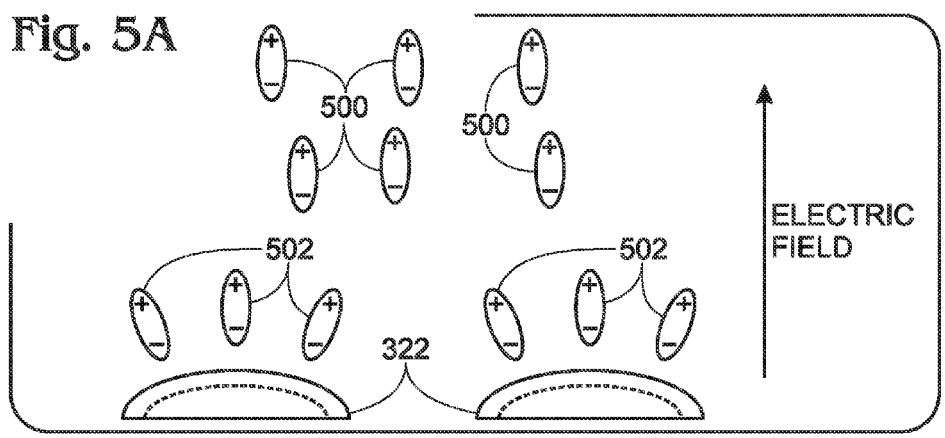

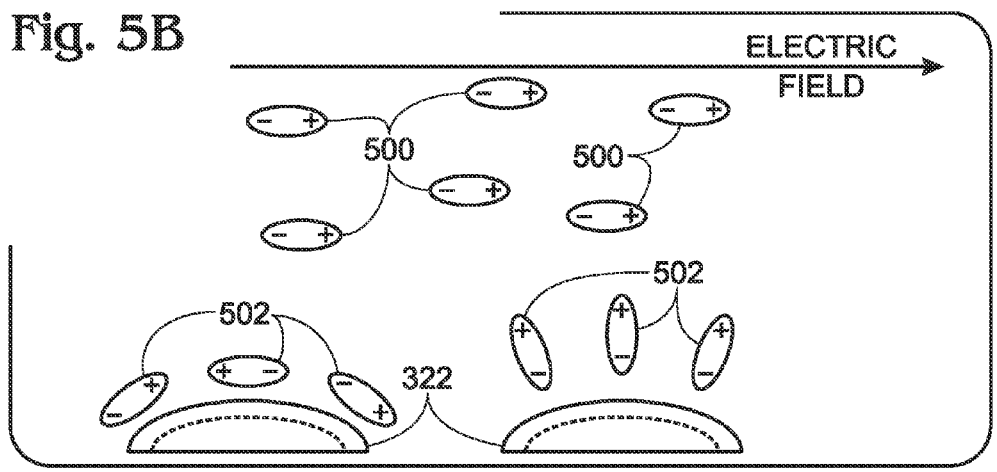
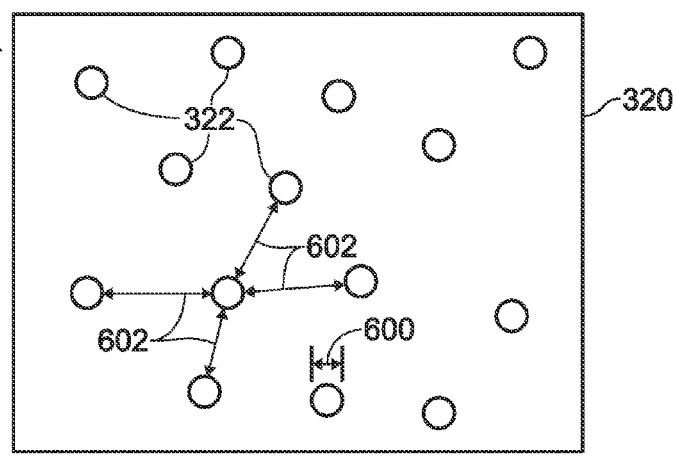
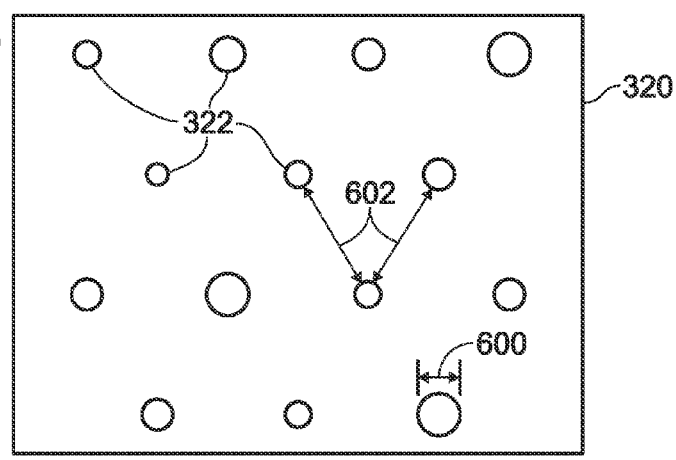

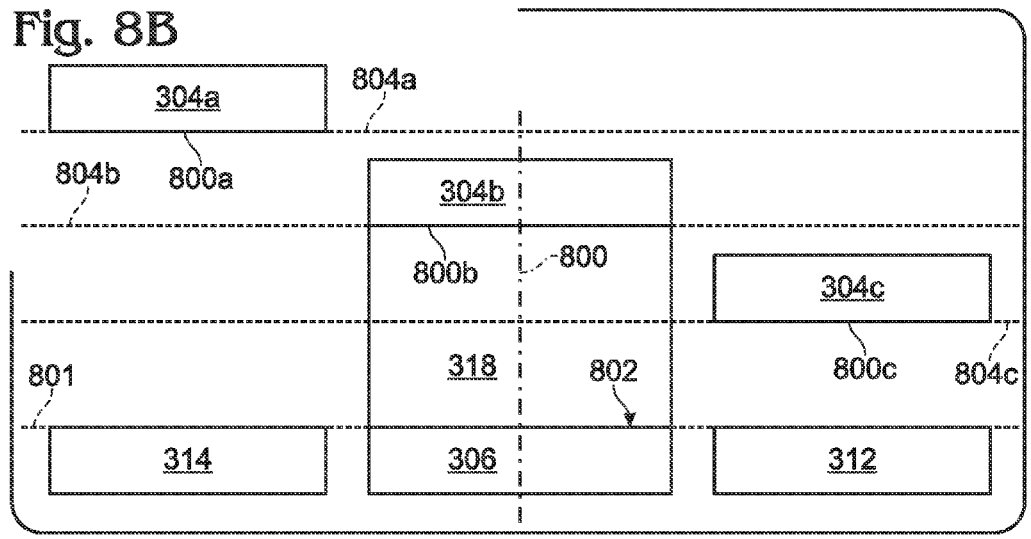
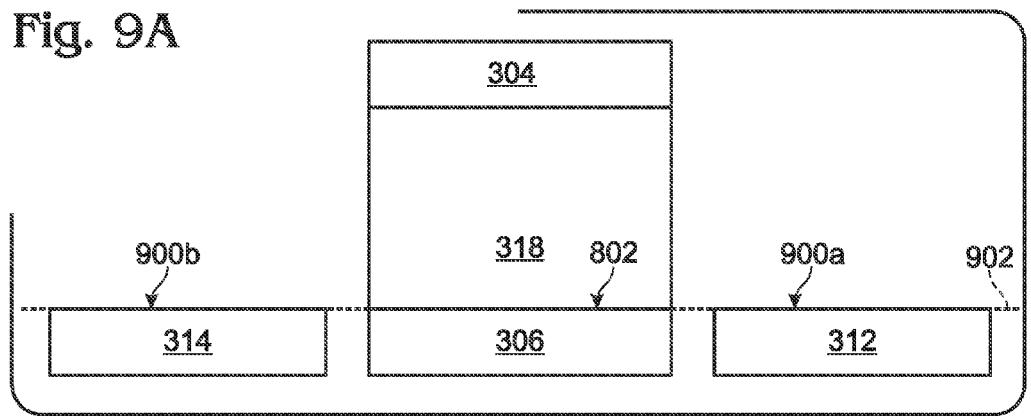

PLASMONIC DEVICE TUNED USING LIQUID CRYSTAL MOLECULE DIPOLE CONTROL

RELATED APPLICATION

The application is a Continuation-in-Part of a pending application entitled, PLASMONIC DEVICE TUNED USING ELASTIC AND REFRACTIVE MODULATION MECHANISMS, invented by Tang et al., Ser. No. 12/621,567, filed on Nov. 19, 2009, which is a Continuation-in-Part of a pending application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009 now U.S. Pat No. 8,045,107, Both the above-referenced applications are incorporated herein by reference.

BACKGROUND OF THE INVENTION

1. Field of the Invention

This invention generally relates to electronic visual display devices and, more particularly, to a color-tunable plasmonic display device that relies upon controlling the orientation of molecule dipoles in a liquid crystal refractive medium.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that Must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixels of this type cannot produce saturated colors with a good contrast.

Some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

FIG. 1 is a partial cross-sectional view of nanoplasmonic display in which the color tuning is accomplished by electrical modulation of the refractive index of an electro-optical material such as a liquid crystal (pending art). Details of the device 100 can be found in the pending application entitled, COLOR-TUNABLE PLASMONIC DEVICE WITH A PARTIALLY MODULATED REFRACTIVE INDEX, invented by Tang et al., Ser. No. 12/614,368. Because of the limited refractive index (n) change of dielectric 106 materials such as liquid crystal, the color tuning range of a device using just this tuning modulation means is very limited. Thus, the device of FIG. 1 uses an additional color tuning mechanism, as described below.

FIG. 2 is a graph simulating the relationship between resonant wavelength change and refractive index for a liquid crystal material surrounding an Ag nanoparticle with a diameter of 80 nanometers. For example, the highest birefringence liquid crystal commercially available only has a Δn of 0.3, which provides a tuning range of only 80 nm, based on the simulation result in FIG. 2. Research labs have reported liquid crystals with a Δn as high as 0.79, but the performance of such materials is not guaranteed. Besides, these materials may not have the appropriate response time or threshold voltage required for the nanoplasmonic display application.

As noted above, the birefringence effect of liquid crystals creates an effective refractive index change that is smaller than the nominal value Δn. This results in a smaller wavelength tuning range than predicted, if an isotropic dielectric medium is assumed. Also, the reflected color has a strong angle dependence if the liquid crystal molecules are uniformly aligned with the electric field passing through the liquid crystal medium. In order to achieve a commercially successful product, both challenges need to be overcome.

It would be advantageous if further improvements in the color range of a plasmonic device could be obtained by an additional mechanism, other than simply modulating the refractive index of the dielectric materials.

SUMMARY OF THE INVENTION

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics.

Described herein is a method for the electrical tuning of the refractive index of the surrounding dielectric material. By making use of the tunable refractive index of liquid crystal or other electro-optical materials, the plasmonic resonance of the metal nanostructures can be tuned across the visible range and, thus, a pixel can exhibit different colors under different external voltages. Liquid crystal (LC), for example, has an electrically tunable refractive index. LC has a response time of a few milliseconds or shorter and, therefore, is fast enough for video applications.

To further enhance the color tuning range of a nanoplasmonic display, the alignment of LC molecules can be controlled using metal nanoparticles. According to basic electromagnetic theory, metal nanoparticles of different shapes and distribution strongly affect the electrical field distribution surrounding them. Since LC molecules are aligned in accordance with the electrical field vectors at their precise locations, the alignment of LC molecules can be controlled by tuning the shape and distribution of metal nanoparticles, as well as the location and shape of electrodes.

Based on this concept, it is possible to control reflected color by simply applying voltages across different electrodes (e.g., vertically and horizontally). Using a dome-shaped nanoparticle for example, a large wavelength tuning range is achieved by maximizing the effective refractive index change "seen" by the nanoparticle. This particular particle shape, due to the isotropic electrical field distribution, results in little angle dependence in the reflected color.

Thus, large electromechanical and electro-optical effects can be achieved simultaneously with a low driving voltage. The color-tunable device operates with ambient light and does not normally require backlight illumination. Since ambient illumination is used to render these images, the power requirements of such a display are dramatically less than a standard LCD and, therefore, reduce the power consumption when introduced into devices such as a cellular phone or laptop.

Accordingly, a plasmonic display device is provided with liquid crystal dipole molecule control. The device is made from a first set of electrodes including at least one electrically conductive top electrode and at least one electrically conductive bottom electrode capable of generating a first electric field in a first direction. A second set of electrodes, including an electrically conductive right electrode and an electrically conductive left electrode, is capable of generating a second electric field in a second first direction. A dielectric layer overlies the bottom electrode, made from a liquid crystal material with molecules having dipoles responsive to an electric field. A plasmonic layer, including a plurality of discrete plasmonic particles, is interposed between the first and second set of electrodes and in contact with the dielectric layer. In one aspect, the plasmonic layer is embedded in the dielectric layer.

The liquid crystal molecules may have permanent electric dipoles, or electric dipoles induced in response to an electric field. The liquid crystal molecules have a first general orientation in response to the first electric field, and a second general orientation in response to the second electric field. However, liquid crystal molecules adjacent the plasmonic particles have a first local orientation in response to the first electric field and the plasmonic particle, and a second local orientation in response to the second electric field and the plasmonic particle. Further, the plasmonic particles have a structure (shape), and the liquid crystal molecules adjacent the plasmonic particles have local orientation responsive to the electric fields and the plasmonic particle structure.

Additional details of the above-described plasmonic display device, as well as a method for creating colors in the visible spectrum using a tunable plasmonic device with liquid crystal dipole molecule control, are provided below.

BRIEF DESCRIPTION OF THE DRAWINGS

FIG. 3 is a partial cross-sectional view of a plasmonic display device with liquid crystal dipole molecule control.

FIG. 4 is a partial cross-sectional view of a first variation of the plasmonic display device of FIG. 3.

FIGS. 5A and 5B are partial cross-sectional views depicting the liquid crystal (LC) molecules in detail.

FIGS. 6A and 6B are plan views of the plasmonic layer of FIG. 3 or 4.

FIGS. 8A and 8B are partial cross-sectional views of a third variation of the plasmonic display device of FIG. 3.

FIGS. 9A and 9B are partial cross-sectional views of a fourth variation of the plasmonic display device of FIG. 3.

DETAILED DESCRIPTION

Figure 1:
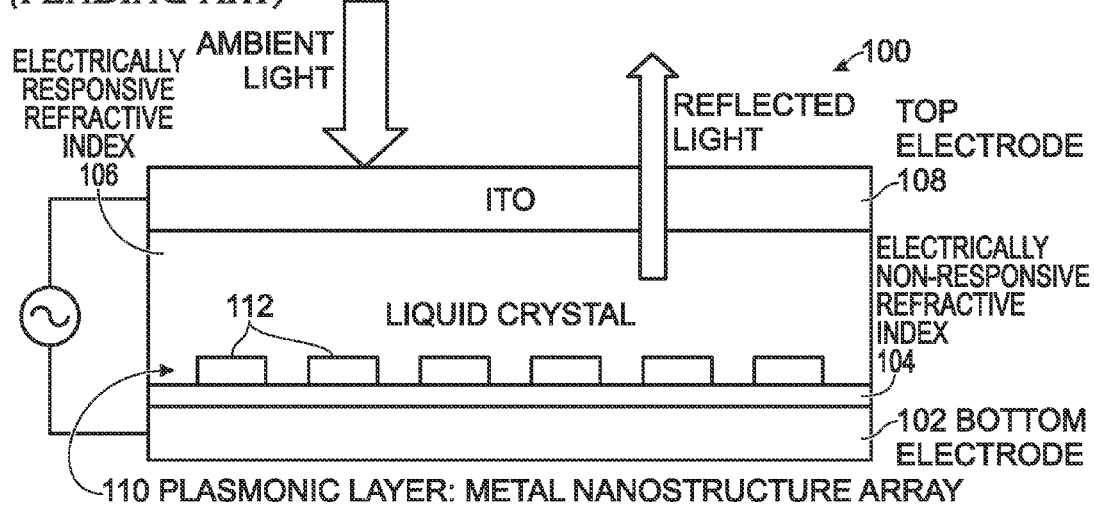
FIG. 1 is a partial cross-sectional view of nanoplasmonic display in which the color tuning is accomplished by electrical modulation of the refractive index of an electro-optical material such as a liquid crystal (pending art).
Figure 2:
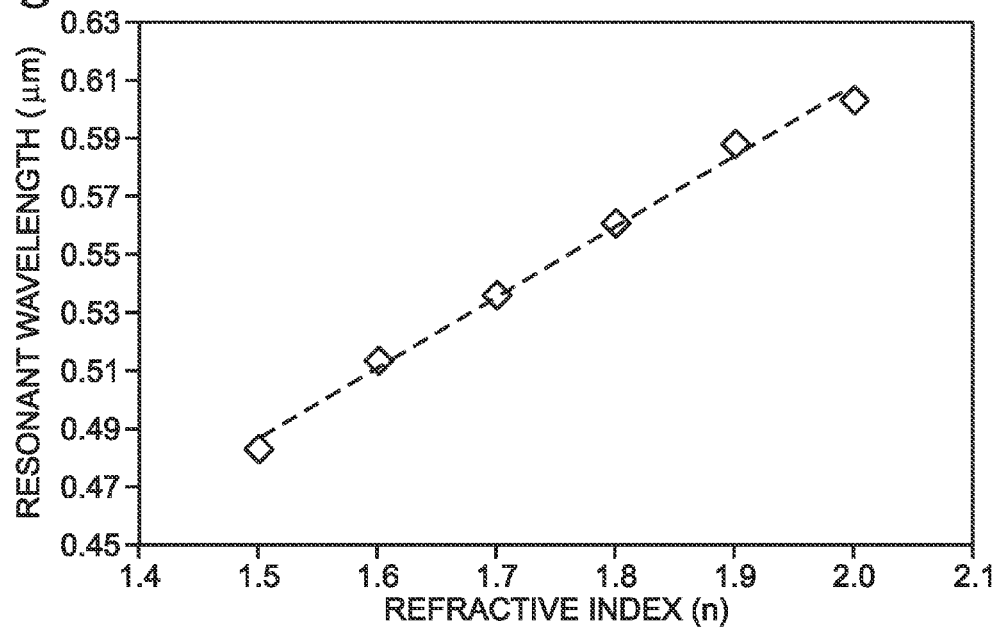
FIG. 2 is a graph simulating the relationship between resonant wavelength change and refractive index for a liquid crystal material surrounding an Ag nanoparticle with a diameter of 80 nanometers.

FIG. 3 is a partial cross-sectional view of a plasmonic display device with liquid crystal dipole molecule control. The device 300 comprises a first set of electrodes 302 including at least one electrically conductive top electrode 304 and at least one electrically conductive bottom electrode 306, capable of generating a first electric field in a first direction 308. A second set of electrodes 310 includes an electrically conductive right electrode 312 and an electrically conductive left electrode 314. The second set of electrodes 310 is capable of generating a second electric field in a second first direction 316. A dielectric layer 318 overlies the bottom electrode 306, made from a liquid crystal material with molecules having dipoles responsive to an electric field. A plasmonic layer 320, including a plurality of discrete plasmonic particles 322, is interposed between the first set of electrodes 302 and second set of electrodes 310, and in contact with the dielectric layer 318. In one aspect as shown, the plasmonic layer 320 is embedded in the dielectric layer 318.

In one aspect, the first and second sets of electrodes 302/310 are transparent to a first range of wavelengths in the visible spectrum of light. In another aspect, the top electrode 304 is optically transparent to the first range of wavelengths in the visible spectrum of light, but the bottom electrode 306, right electrode 312, and left electrode 314 are optically reflective to the first range of light wavelengths. Indium tin oxide (ITO) and ZnO are examples of a transparent material. Optically reflective (opaque) electrodes can be made from a material such as Al, Ti, or Cu.

FIG. 4 is a partial cross-sectional view of a first variation of the plasmonic display device of FIG. 3. In this aspect, the plasmonic layer 320 overlies the bottom electrode 306. The dielectric layer 318 overlies the plasmonic layer particles 322 and exposed regions of the bottom electrode 306 between the plasmonic layer particles 322. Also in this aspect, the second set of electrodes 310 are in the same horizontal (in-plane) plane 400 as the bottom electrode 306. However, as described below, other orientations are possible.

FIGS. 5A and 5B are partial cross-sectional views depicting the liquid crystal (LC) molecules in detail. In FIG. 5A, the liquid crystal molecules 500 have a first general orientation in response to the first electric field. The molecule 500 orientation is represented by the position of the "+" and "−" polarities of the dipole. More explicitly, the molecules 500 away from the plasmonic particles 322 have the first general orientation. In FIG. 5B, the LC molecules have a second general orientation in response to the second electric field.

In one aspect, the liquid crystal molecules 500 (and molecules 502, below) have permanent electric dipoles. Alternately, the liquid crystal molecules 500/502 have electric dipoles induced in response to an electric field.

In contrast, liquid crystal molecules 502 adjacent the plasmonic particles 322 have a first local orientation in response to the first electric field and the plasmonic particle 322. That is, the LC molecules 502 are responsive to the proximity of the plasmonic particles 322. Likewise, liquid crystal molecules 502 adjacent the plasmonic particles 322 have a second local orientation in response to the second electric field and the plasmonic particle 322.

More explicitly, the plasmonic particles have a structure or shape, and liquid crystal molecules 502 adjacent the plasmonic particles 322 have a first local orientation in response to the first electric field and the plasmonic particle structure. Likewise, liquid crystal molecules 502 adjacent the plasmonic particles 322 have a second local orientation in response to the second electric field and the plasmonic particle structure.

As shown in FIGS. 5A and 5B, the plasmonic particle structures may have a shape parallely aligned in the same plane. As shown, the particle structure in domed, with the domes parallely aligned in the horizontal plane. However, it should be understood that a variety of particle structures and orientations may be employed. In one aspect, the plasmonic particles have a center-symmetric structure. Dome and cup structures are examples of center-symmetric shapes. Center-symmetric shapes tend to reduce the dependency between reflectivity and viewing angle. Some other examples of particle structures include composite shell, egg, disk, sphere, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. Note: the device may be enabled using other structures, as an exhaustive collection of structures and shapes in not shown. In another aspect (not shown), the plasmonic particles have a uniform structure (shape), and a size that varies (see FIG. 6B).

FIGS. 6A and 6B are plan views of the plasmonic layer of FIG. 3 or 4. Generally, the plasmonic particles 322 in the plasmonic layer 320 may be arranged in a random order or symmetrical array. In FIG. 6A, the particles 322 are randomly distributed. In FIG. 6B the plasmonic particles 322 are in a two-dimensional triangular array. A wide variety of two dimensional and three dimensional array patterns are known in the art, and the device is not limited to any particular type of array pattern.

The plasmonic particles 322 in the plasmonic layer 320 may be a material such as Ag, Au, Cu, Pt, Al, or alloys of the above-mentioned metals. Typically, the plasmonic particles 322 have a size 600 in the range of 10 nanometers (nm) to 300 nm. Typically, the average spacing 602 between particles is in the range of about 700 nm, or less.

Figure 7A:
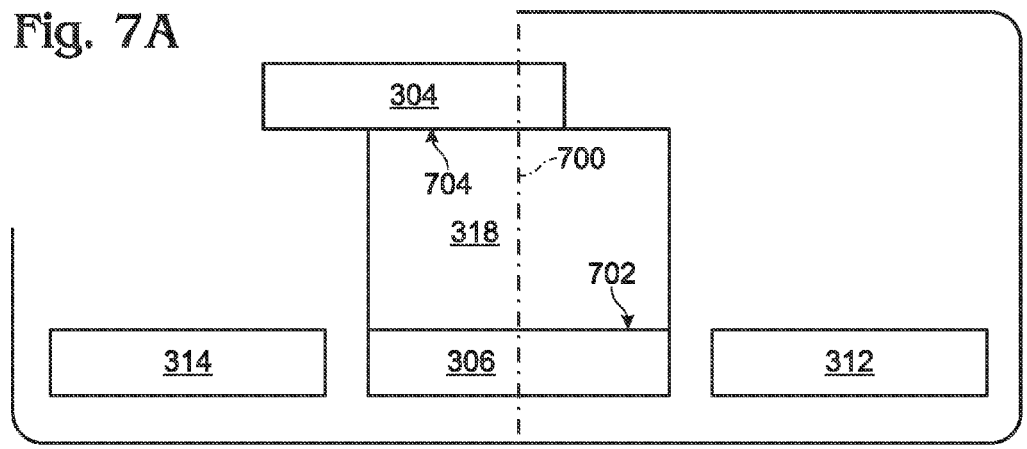
FIGS. 7A and 7B are partial cross-sectional views of a second variation of the plasmonic display device of FIG. 3.
Figure 7B:
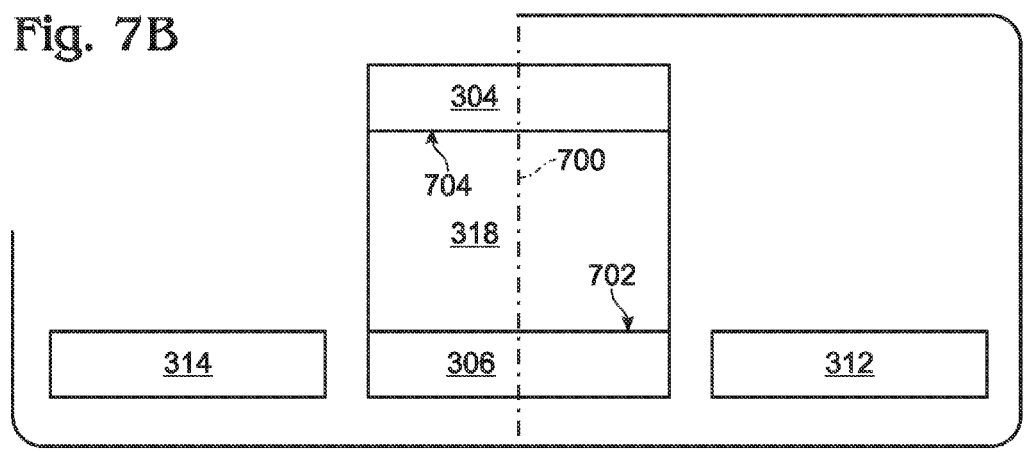

FIGS. 7A and 7B are partial cross-sectional views of a second variation of the plasmonic display device of FIG. 3. As shown in FIG. 7A, the top electrode 304 is horizontally offset from the bottom electrode 306. As used herein, horizontally offset is defined to a condition where an orthogonal line 700 bisecting the bottom electrode top surface 702 fails to bisect the top electrode bottom surface 704. In contrast, see FIG. 7B, the top electrode 304 horizontally overlies the bottom electrode 306 because orthogonal line 700 bisects both the top and bottom electrode surfaces. As shown, the top and bottom electrode surfaces 702 and 704 have about the same cross-section. However, the device can be enabled with electrodes having different surface cross-sections, areas, or lengths.

Figure 8A:
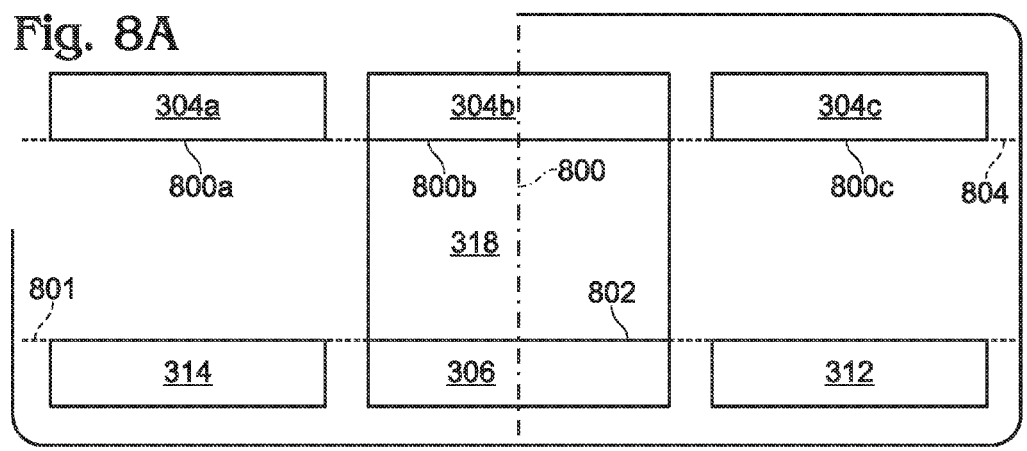

FIGS. 8A and 8B are partial cross-sectional views of a third variation of the plasmonic display device of FIG. 3. In this aspect, the top electrode is a selectively engagable electrode. Shown are selectively engagable electrodes 304a, 304b, and 304c. However, the device is not limited to any particular number of selectively engagable electrodes. In FIG. 8A, the top electrodes 304a-304c are both horizontally overlying and horizontally offset with respect to the bottom electrode 306. More explicitly, electrode 304b is overlying because orthogonal line 800 bisects the surface 800b of electrode 304b and the surface 802 of bottom electrode 306. Electrodes 304a and 304c are horizontally offset because line 800 does not bisect their respective surfaces 800a and 800c. Electrodes 304a-304c are vertically aligned because the surfaces 800a-800c are all aligned in the same horizontal plane 804. That is, surfaces 800l-800c are lie in the same horizontal plane 804, and the vertical dimensions between planes 801 and 804 are equal-distant.

In FIG. 8B, the top electrodes 304a-304c are horizontally overlying and horizontally offset with respect to the bottom electrode 306, as described above. In addition, electrodes 304a-340c are vertically offset from each other, since surfaces 800a-800c are respectively aligned in different horizontal planes 804a-804c. That is, the vertical dimensions between plane 801, and planes 804a, 804b, and 804c are different.

Figure 9B:
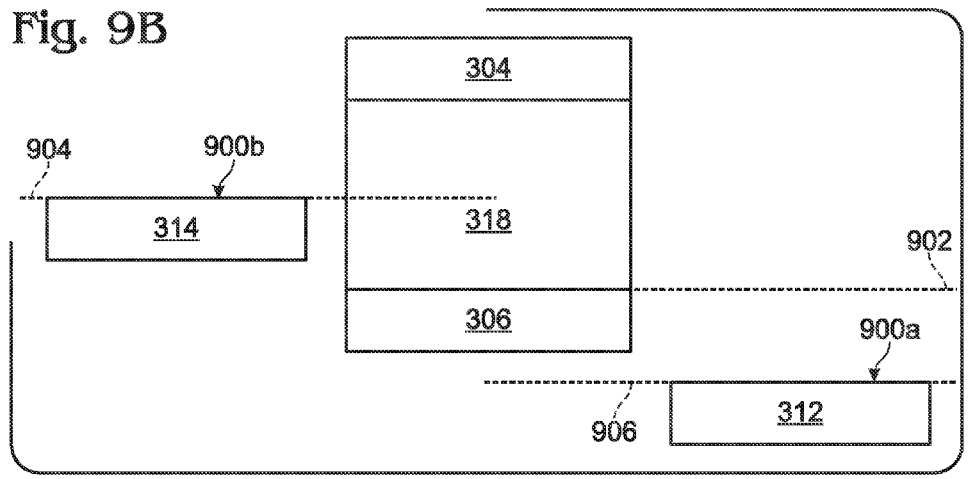

FIGS. 9A and 9B are partial cross-sectional views of a fourth variation of the plasmonic display device of FIG. 3. In FIG. 9A, both the right electrode 312 and left electrode 314 have an in-plane orientation, since both their top surfaces, 900a and 900b respectively, are in the same plane 902 as the bottom electrode top surface 802. In FIG. 9B, both the right electrode 312 and left electrode 314 have an offset orientation, since both their top surfaces, 900a and 900b, respectively aligned in planes 904 and 906, are different planes than plane 902, which is aligned with the bottom electrode top surface 802.

A number of other device variations can be enabled with other electrode orientation and sizes. Although generally parallel electrode surfaces have been shown to illustrate the device, other variations of the device can be derived by manipulating the relative angles between electrode surfaces. Further, a number of different plasmonic devices may be formed by combining the device structures shown in FIGS. 3 through 9B.

Functional Description

Plasmons, which are quantized oscillations of the free electron gas in a metal or other material, affect how light interacts with a structure and thereby determine the apparent color of the structure. This phenomenon generally occurs through the coupling of surface plasmons with light, to form surface plasmon-polaritons. Tuning the color of metal nanostructures is possible because the plasmon resonant frequency of such structures generally depends on the size, shape, distance between plasmonic particles, and the dielectric properties of the surrounding material. Thus, the optical absorption and scattering spectra (and therefore the color) of metal structures can be varied by altering any one or more of these characteristics.

Scientists and engineers are able to use liquid crystals in a variety of applications because external perturbation can cause significant changes in the macroscopic properties of the liquid crystal system. Both electric and magnetic fields can be used to induce these changes. The magnitudes of the fields, as well as the speed at which the molecules align are important characteristics with which the industry deals. Finally, special surface treatments can be used in liquid crystal devices to force specific orientations of the director.

Figure 10:
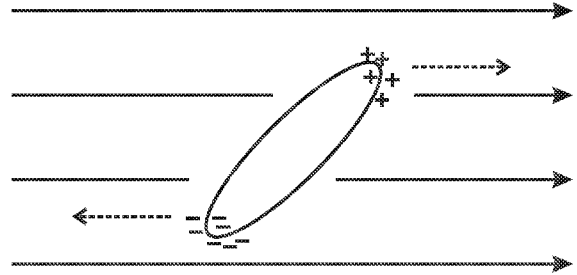
FIG. 10 is a diagram of a liquid crystal molecule influenced by an electric field clue to a permanent or induced dipole.

FIG. 10 is a diagram of a liquid crystal molecule influenced by an electric field due to a permanent or induced dipole. The response of liquid crystal molecules to an electric field is the major characteristic utilized in industrial applications. The ability of the director to align along an external field is caused by the electric nature of the molecules. Permanent electric dipoles result when one end of a molecule has a net positive charge while the other end has a net negative charge. When an external electric field is applied to the liquid crystal, the dipole molecules tend to orient themselves along the direction of the field. The solid line arrows represent the electric field vector and the dotted line arrows show the electric force on the molecule.

Even if a molecule does not form a permanent dipole, it can still be influenced by an electric field. In some cases, the field produces a slight re-arrangement of electrons and protons in molecules such that an induced electric dipole results. While not as strong as permanent dipoles, an orientation with the external field still occurs.

Figure 11A:
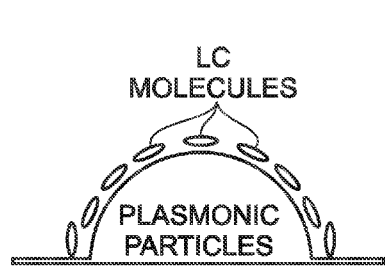
FIGS. 11A and 11B represent two different scenarios of LC molecule alignment, leading to two different effective refractive indexes (n), as seen by the metal nanoparticle.
Figure 11B:
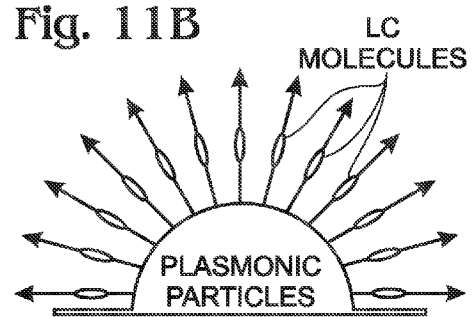

FIGS. 11A and 11B represent two different scenarios of LC molecule alignment, leading to two different effective refractive indexes (n), as seen by the metal nanoparticle. Because of the birefringence of liquid crystal materials, the effective refractive index that each metal nanoparticle "sees" is in fact a squared average of the indexes along two directions. Therefore, depending on the LC molecule alignment, different effective indexes can be achieved. As shown, if all the LC molecules are aligned parallel to the surface of a dome particle (FIG. 11A), the effective index reaches its minimum value $n_o$, i.e., the ordinary refractive index value. If, as shown in FIG. 11B, the LC molecules are aligned perpendicular to the surface of the dome particle, the effective index reaches the maximum value square root of $((n_c^2+n_o^2)/2)$. This refractive index change is the largest value that can be achieved with a nematic liquid crystal.

Figure 12A:
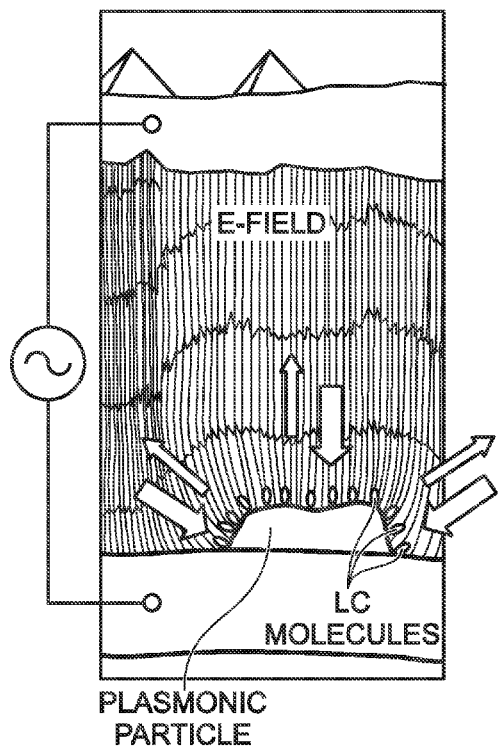
FIGS. 12A and 12B depict electric field distribution simulations for disk and dome nanoparticles, respectively, using top and bottom electrodes.
Figure 12B:
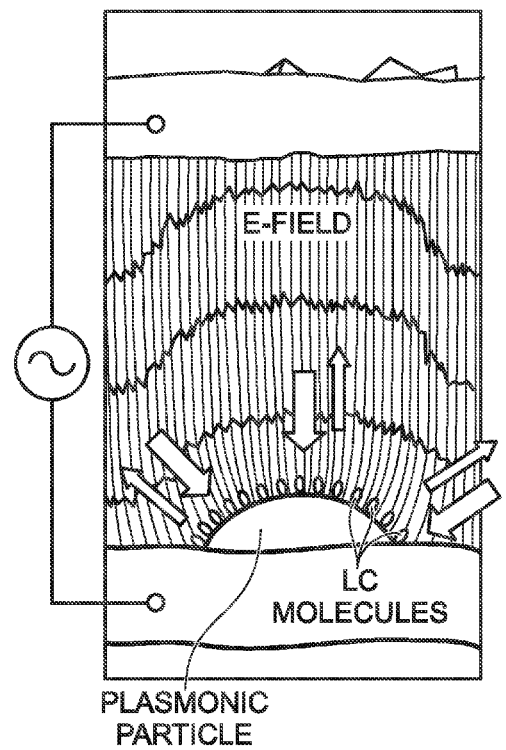

FIGS. 12A and 12B depict electric field distribution simulations for disk and dome nanoparticles, respectively, using top and bottom electrodes. The electrical field simulations were conducted using Coventor software. As shown, the field distribution for both disk and dome nanoparticles are plotted with a voltage applied across top and bottom electrodes. The dome nanoparticle (FIG. 12B) shows a more symmetric field profile that approximates the scenario in FIG. 11B. A dome nanoparticle, as expected, induces the alignment of LC molecules perpendicular to the particle surface and, therefore, has a bigger effective refractive index than a disk nanoparticle. Because of the symmetry to the center of the dome, the reflected light at the dome has very little angle dependence, while the disk nanoparticle may result in different colors at different angles due to the different effective refractive index at different angles.

Figure 13:
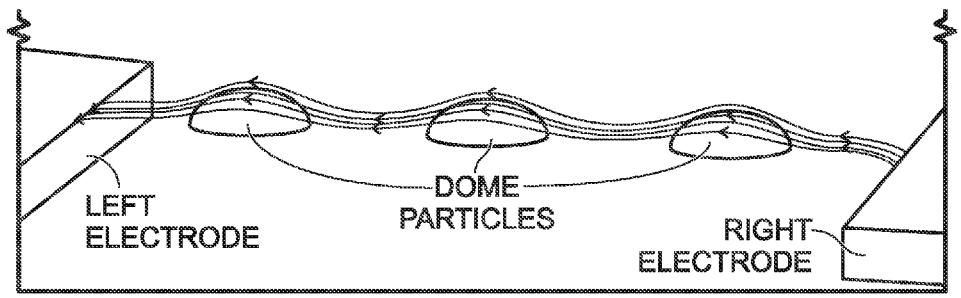
FIG. 13 is a diagram depicting electric field distribution simulated for dome nanoparticles with two in-plane (left/right) electrodes.

FIG. 13 is a diagram depicting electric field distribution simulated for dome nanoparticles with two in-plane (left/right) electrodes. When a voltage is applied in-plane, the electrical field lines are parallel to the surface of the dome. In this way, the scenario of FIG. 11A is obtained, in which the minimum effective refractive index is achieved by aligning the LC molecules parallel to the surface of the nanoparticles.

Thus, it is possible to control reflected color by simply applying voltages across different electrodes (vertically and horizontally). The shape and distribution of metal nanoparticles strongly affect electrical field distribution and thus light reflection. Using a dome nanoparticle, a very large wavelength tuning range is achieved, while minimizing the angle dependence of the reflected color.

Figure 14:
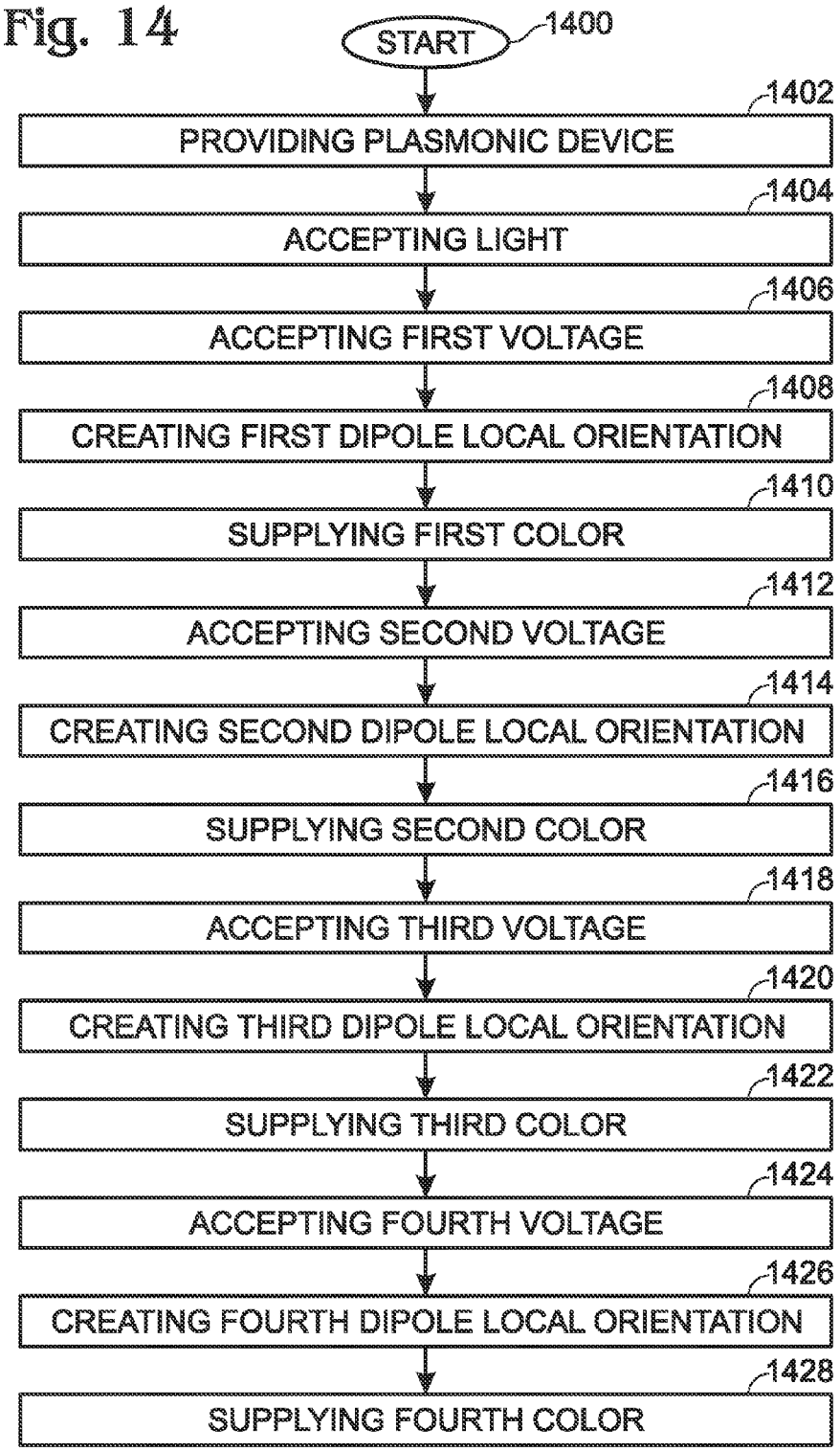
FIG. 14 is a flowchart illustrating a method for creating colors in the visible spectrum using a plasmonic display device with a liquid crystal dipole molecule control.

FIG. 14 is a flowchart illustrating a method for creating colors in the visible spectrum using a plasmonic display device with a liquid crystal dipole molecule control. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. Generally however, the steps are performed in the numeric order. The method starts at Step 1400.

Step 1402 provides a plasmonic device with electrically conductive top and bottom electrodes, electrically conductive right and left electrodes, and a dielectric layer overlying the bottom electrode. The dielectric layer is made from an liquid crystal material with molecules having dipoles responsive to an electric field. A plasmonic layer including a plurality of discrete plasmonic particles, is interposed between the first and second set of electrodes and in contact with the dielectric layer. Various examples of plasmonic device structures have been presented above. Step 1404 accepts a full-spectrum visible light incident to the top electrode. Step 1406 accepts a first voltage potential between the top and bottom electrodes, generating a first electric field. Step 1408 creates a first dipole local orientation in liquid crystal molecules adjacent the plasmonic particles in response to the first electric field. Step 1410 supplies a first primary color in response to the first dipole local orientation, where a primary color exhibits a single wavelength peak with a spectral full width at half magnitudes (FWHMs) in the visible spectrum of light. Step 1412 accepts a second voltage potential between the right and left electrodes, generating a second electric field. Step 1414 creates a second dipole local orientation in the liquid crystal molecules adjacent the plasmonic particles in response to the second electric field. Step 1416 supplies a second primary color in response to the second dipole local orientation.

In one aspect, Step 1402 provides a plasmonic device with plasmonic particles having a first particle structure. Then, creating the first and second dipole local orientations respectively in Steps 1408 and 1414 includes creating the local orientations in response to the interaction of the electric fields and the plasmonic first particle structure.

In another aspect, Step 1418 accepts a third voltage potential between the top and bottom electrodes, generating a third electric field. Step 1420 creates a third dipole local orientation in liquid crystal molecules adjacent the plasmonic particles in response to the third electric field. Step 1422 supplies a third primary color in response to the third dipole local orientation. Step 1424 accepts a fourth voltage potential between the right and left electrodes, generating a fourth electric field. Step 1426 creates a fourth dipole local orientation in the liquid crystal molecules adjacent the plasmonic particles in response to the fourth electric field. Step 1428 supplies a fourth primary color in response to the fourth dipole local orientation. Between the four (or more) electrodes, a number of different electric fields can be generated, resulting in a like number of dipole local orientations, and colors.

A color-tunable plasmonic device with liquid crystal dipole molecule control is provided, along with an associated tuning method. Examples of specific materials and structures have been used to illustrate the invention. However, the invention is not limited to merely these examples. Other variations and embodiments of the invention will occur to those skilled in the art.

We claim:

1. A plasmonic display device with liquid crystal dipole molecule control, the device comprising:
   a first set of electrodes including at least one electrically conductive top electrode and at least one electrically conductive bottom electrode capable of generating a first electric field in a first direction;
   a second set of electrodes including an electrically conductive right electrode and an electrically conductive left electrode capable of generating a second electric field in a second first direction;
   a dielectric layer overlying the bottom electrode, made from a liquid crystal material with molecules having dipoles responsive to an electric field; and,
   a plasmonic layer including a plurality of discrete plasmonic particles, interposed between the first and second set of electrodes and in contact with the dielectric layer.

2. The device of claim 1 wherein the right and left electrodes have an orientation with respect to the bottom electrode selected from a group consisting of in-plane and offset.

3. The device of claim 1 wherein the plasmonic layer is embedded in the dielectric layer.

4. The device of claim 1 wherein the liquid crystal molecules have a first general orientation in response to the first electric field; and,
   wherein the liquid crystal molecules have a second general orientation in response to the second electric field.

5. The device of claim 4 wherein liquid crystal molecules adjacent the plasmonic particles have a first local orientation in response to the first electric field and the plasmonic particle; and,
   wherein liquid crystal molecules adjacent the plasmonic particles have a second local orientation in response to the second electric field and the plasmonic particle.

6. The device of claim 5 wherein the plasmonic particles have a structure;
   wherein liquid crystal molecules adjacent the plasmonic particles have a first local orientation in response to the first electric field and the plasmonic particle structure; and,
   wherein liquid crystal molecules adjacent the plasmonic particles have a second local orientation in response to the second electric field and the plasmonic particle structure.

7. The device of claim 6 wherein the plasmonic particle structures each have a shape parallely aligned in the same plane.

8. The device of claim 1 wherein the first and second sets of electrodes are transparent to a first range of wavelengths in the visible spectrum of light.

9. The device of claim 1 wherein the plasmonic particles in the plasmonic layer are arranged in an order selected from a group consisting of random and a symmetrical array.

10. The device of claim 1 wherein the plasmonic particles in the plasmonic layer are a material selected from a group consisting of Ag, Au, Cu, Pt, Al, and alloys of the above-mentioned metals.

11. The device of claim 1 wherein the plasmonic particles in the plasmonic layer have a size in a range of 10 nanometers (nm) to 300 nm.

12. The device of claim 1 wherein the top electrode is optically transparent to a first range of wavelengths in the visible spectrum of light; and,
    wherein the bottom, right, and left electrodes are optically reflective to the first range of light wavelengths.

13. The device of claim 1 wherein the plasmonic particles have a center-symmetric structure.

14. The device of claim 1 wherein the plasmonic particles have a uniform structure, and a size that varies.

15. The device of claim 1 wherein the top electrode has an orientation with respect to the bottom electrode selected from a group consisting of overlying and offset.

* * * * *